Figure 1:
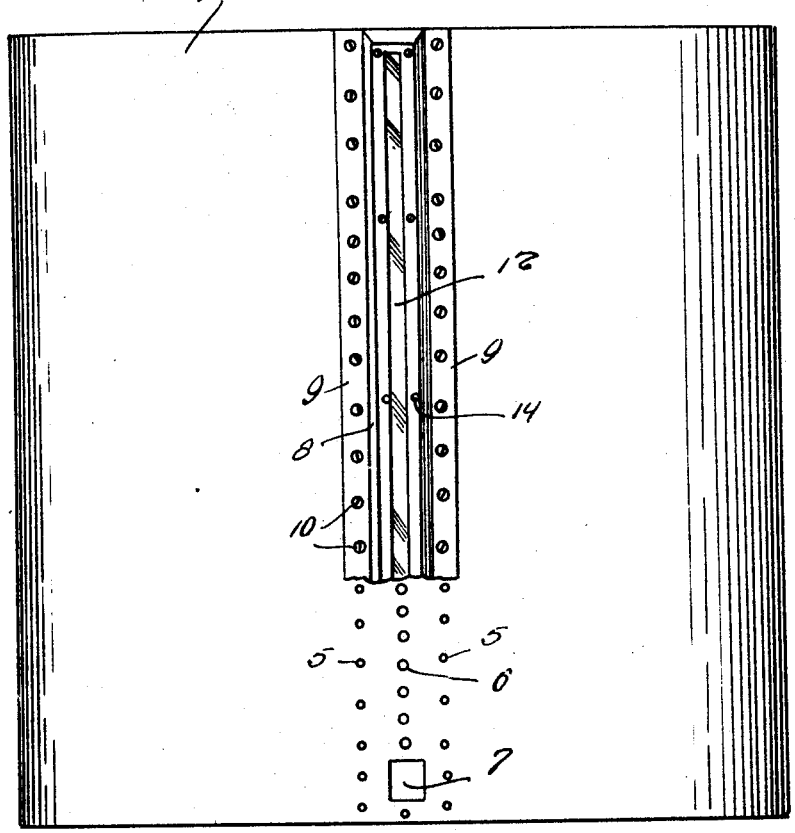

May 8, 1928.  
E. WENCEL  
1,669,110  
SIGHT GAUGE FOR GRAIN BINS  
Filed Feb. 26, 1927

Inventor  
Edward Wencel

By Clarence A. O'Brien  
Attorney

Patented May 8, 1928.

1,669,110

UNITED STATES PATENT OFFICE.

EDWARD WENCEL, OF LYONS, COLORADO.

SIGHT GAUGE FOR GRAIN BINS.

Application filed February 26, 1927. Serial No. 171,339.

This invention relates to new and useful improvements in grain bins, particularly those used in conjunction with harvesting threshing machines, and has for its primary object to so construct a bin of this character wherein the quantity of grain therein may always be determined at a glance and this without requiring the operator to look into the top of the bin, which is usually necessary in harvester thresher grain bins now in use.

A most important object of the invention resides in the provision of a sight gauge of this character that may be readily associated with bins now in use, it only being necessary to form a plurality of pre-arranged holes within the bin to permit the attachment of the improved gauge and to permit the entrance of the grain of the bin into the gauge proper so that the height of the grain may be readily determined.

With the foregoing and other objects in view as the nature of the invention will be better understood, the same comprises the novel form, combination and arrangement of parts hereinafter more fully described, shown in the accompanying drawing and claimed.

Figure 2:
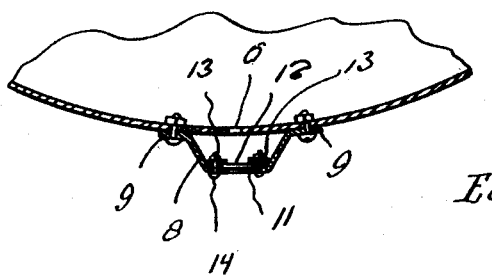

In the drawing wherein like reference characters indicate corresponding parts throughout both of the views:

Figure 1 is a side elevation of a conventional harvester thresher grain bin constructed in accordance with the present invention, a portion of the gauge structure per se being broken away for more clearly disclosing the formation of the holes within the bin to permit the attachment of the gauge proper and to permit the entrance of the grain into the gauge as well as its discharge therefrom when the grain is fed from the bin, and Figure 2 is a fragmentary section through the bin at the gauge point for more clearly disclosing the construction of the gauge in cross section.

Now having particular reference to the drawing, 5 designates a conventional design of grain bin employed in conjunction with harvester thresher machines. In carrying out my invention it is necessary that the bin be provided throughout its length at a predetermined point thereon with three rows of spaced openings 5—5 and 6, these rows being of equally spaced distance apart as clearly disclosed in Figure 1.

At the lower end of center row of openings 6 which are slightly greater in diameter than the outer rows 5—5 said bin is provided with a large square opening 7 for a purpose more fully described.

The gauge per se consists of a strip of channel metal 8 of a length equivalent to the length of the tank A and having at its edges lateral flanges 9—9 within which are spaced openings for registry with the outer rows of openings 5—5 in said tank in order that the channel strip may be secured to the tank through the medium of stove bolts 10. The channel portion of this strip is closed at its ends as indicated in Figure 1 so as to prevent the passage of the grain therethrough. The center wall of the channel strip 8 is formed throughout its length with a slot 11 and arranged upon the inner side of this center wall is a glass strip 12 secured to said center wall in grain tight manner by edge strips 13—13 that are in turn secured to the center of the channel strip by stove bolts 14.

Obviously as grain is delivered to the bin A the same will pass into the channel strip 8 through the center openings 6 and the large bottom opening 7 with the result that the level of the grain within the bin will always be visible through the glass 12. As the bin is emptied, the grain will have a free return through the large opening 7 at the bottom thereof.

It will thus be seen that I have provided a highly novel, simple, and efficient sight gauge for grain bins that is well adapted for all the purposes heretofore designated and even though I have herein shown and described the invention as consisting of certain detail structural elements it is nevertheless to be understood that some changes may be made therein without affecting the spirit and scope of the appended claim.

Having thus described the invention, what I claim is:—

In a bin gauge of the class described, wherein the bin is provided throughout its length with a row of vertically spaced openings, a channel shaped housing arranged upon the outer surface of the bin over the openings, there being laterally extending flanges formed on the longitudinal side edges of said channel shaped housing and secured to the bin, the respective ends of the housing being closed, the front side of the housing being formed with an opening throughout substantially its entire length, a strip of transparent material arranged over the opening so that the grain passing through the bin openings into the housing may be viewed, said bin being formed at the lower end of the aforementioned row of openings with an enlarged opening to permit the easy return flow of the grain from the gauge housing into the bin.

In testimony whereof I affix my signature.

EDWARD WENCEL.